United States Patent [19]

Danelson et al.

[11] Patent Number: 4,586,593

[45] Date of Patent: * May 6, 1986

[54] DRIVE ASSEMBLY

[76] Inventors: Terry L. Danelson, Box 154, R 33; Barry J. Harmon, Box 965, both of Scobey, Mont. 59263

[*] Notice: The portion of the term of this patent subsequent to Oct. 8, 2002 has been disclaimed.

[21] Appl. No.: 386,014

[22] Filed: Jun. 7, 1982

[51] Int. Cl.[4] .................. A01B 39/19; F16D 11/00
[52] U.S. Cl. ............................. 192/67 R; 172/44; 172/311; 172/456; 172/698; 403/229; 464/57; 464/901
[58] Field of Search .................. 192/62, 67 R, DIG. 2, 192/67 P; 464/57, 901, 147, 185, 37; 172/44, 698, 311, 456; 267/179; 403/229

[56] References Cited

U.S. PATENT DOCUMENTS

| 1,883,342 | 10/1932 | Densmore | 464/37 X |
|---|---|---|---|
| 2,114,633 | 4/1938 | Hedges | 192/67 R X |
| 2,254,566 | 9/1941 | Cornell, Jr. | 403/229 X |
| 2,578,270 | 10/1950 | Fundingsland | 192/67 R X |
| 2,603,137 | 7/1952 | Fundingsland | 192/67 R X |
| 3,255,830 | 6/1966 | Groenke | 172/456 |
| 3,333,645 | 8/1967 | Gustafson | 172/456 |
| 3,360,053 | 12/1967 | Doepker | 172/44 |
| 3,522,713 | 8/1970 | Hayes | 464/57 X |
| 3,552,773 | 1/1971 | Purrer et al. | 172/311 X |
| 3,611,748 | 10/1971 | Wallgren | 464/57 X |
| 3,702,639 | 11/1972 | Womble et al. | 192/67 R X |
| 4,057,114 | 11/1977 | Anderson | 192/67 R X |
| 4,133,497 | 1/1979 | Rothlisberger | 464/57 X |
| 4,180,990 | 1/1980 | Hill | 464/37 |
| 4,397,358 | 8/1983 | Handy | 172/44 |
| 4,433,767 | 2/1984 | Thor | 192/67 P |

FOREIGN PATENT DOCUMENTS

| 0181470 | 3/1955 | Austria | 192/67 R |
|---|---|---|---|
| 0532026 | 10/1956 | Canada | 464/37 |
| 0608364 | 9/1960 | Italy | 192/67 R |
| 0586279 | 12/1977 | U.S.S.R. | 464/37 |
| 0779677 | 11/1980 | U.S.S.R. | 192/67 R |

Primary Examiner—Rodney H. Bonck
Attorney, Agent, or Firm—Arthur L. Urban

[57] ABSTRACT

A separable drive assembly including first and second shafts, the shafts being normally aligned axially in an end to end relationship, a coupling portion operatively connecting adjacent ends of the first and second shafts, the coupling portion including a resilient section extending between the adjacent ends of the first and second shafts, a connector section extending from one end of the resilient section, the connector section including an axial opening, the adjacent end of the first shaft engaging and being affixed within the connector section opening, a guide section extending from the opposite end of the resilient section, the guide section including an enlarged end section, an axial bore extending through the guide section, the bore being capable of slidably engaging the adjacent end of the second shaft, the axial bore through the guide section having a cross-section substantially the same as the cross-sectional configuration of the second shaft end but slightly larger; whereby moving the adjacent first and second shaft ends toward each other will cause the end of the second shaft to slidably engage the axial bore in the guide section of the coupling portion to operatively connect the first and second shafts in a drive assembly.

3 Claims, 4 Drawing Figures

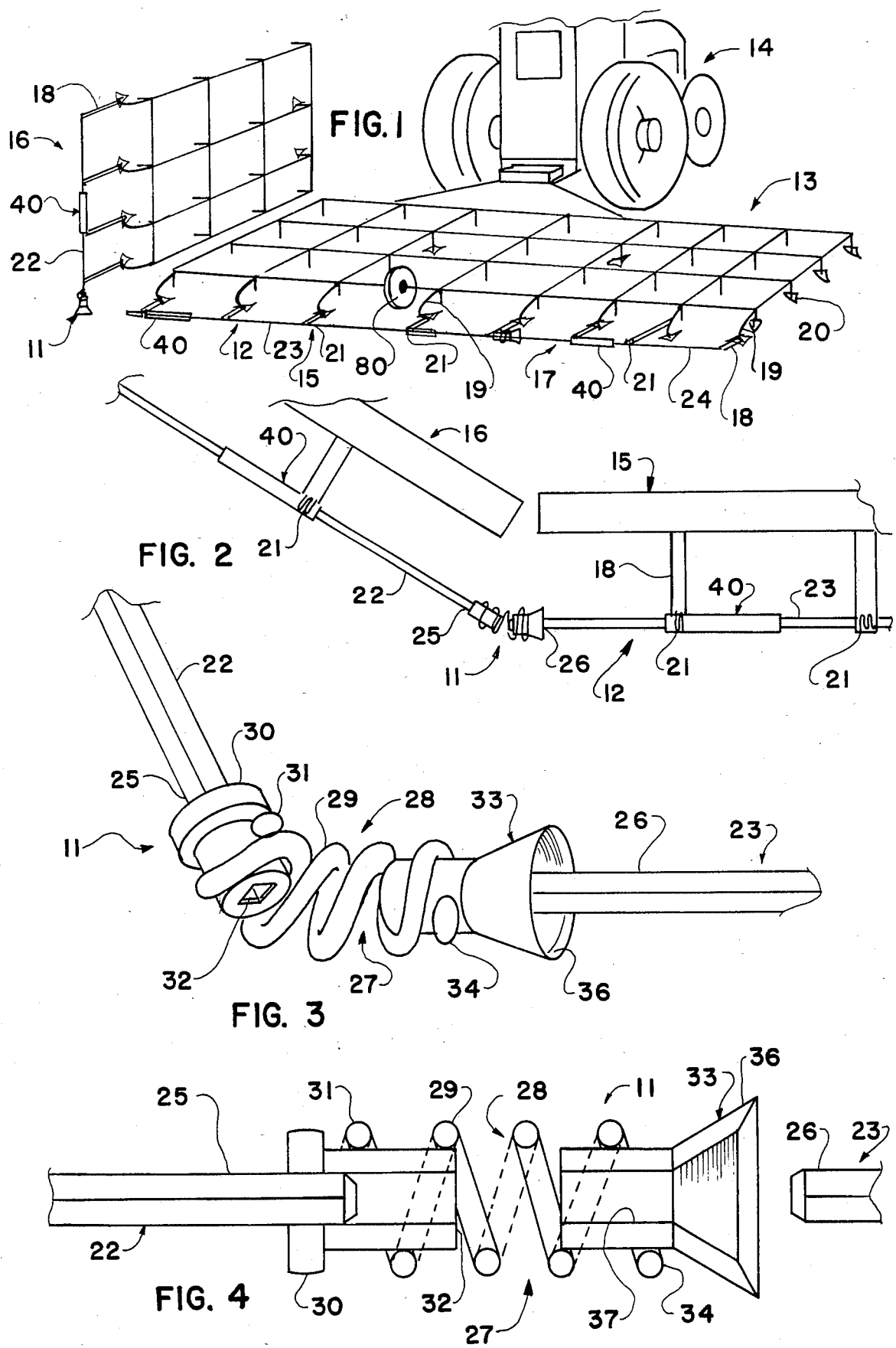

DRIVE ASSEMBLY

This invention relates to a novel drive assembly and more particularly relates to a drive assembly that can be separated.

Since the development of power sources such as water wheels, windmills, engines, motors and the like, there has been the problem of utilizing the power generated efficiently. Such devices generally have an output shaft which rotates at a high rate of speed. To utilize the power, it is necessary to connect a power consuming mechanism to the output shaft. This ordinarily requires some type of coupling arrangement.

One common coupling is the combination of pulleys and a belt. A pulley is mounted on the power source output shaft and a second pulley on an input shaft of the mechanism to be driven. An endless belt is looped over the pulleys and tensioned. If desired, sprockets can be substituted for the pulleys and a chain for the belt to achieve a positive interconnection of the components.

While the use of pulleys and belts or sprockets and chains provides useful drive arrangements in some situations, they are not without problems. The two shafts must be aligned parallel to but displaced from one another. Also, uncoupling of the two shafts may not be accomplished conveniently.

Another drive arrangement which is employed frequently where the shafts are axially aligned is the direct connection of the shafts through a sleeve connector. This arrangement requires that the two shafts be accurately aligned prior to coupling.

To couple two shafts which cannot be accurately aligned or in which the alignment changes during use, it is common to employ a universal joint. Universal joints provide flexibility of the coupling during rotation of the shafts.

Although the above coupling arrangements are satisfactory in some drive situations, they are not suitable in all cases. One deficiency that they have in common is that they generally require coupling by hand. Thus, these expedients are less than desirable in drive arrangements that require frequent coupling and uncoupling.

This is particularly true in situations in which an operator is positioned remote from the drive mechanism. One such use is in farm machinery. Frequently, the machinery is so large that the operator is positioned at a considerable distance from the drive mechanism. For example, the operator may be located in the driver's seat of a tractor, while the drive connection may be located at the rear of the tractor close to the ground at a point beyond the reach of the operator.

With other equipment, the drive connection may be on machinery being drawn by the tractor. An example of such a drive connection can be found in rod weeder attachments. Such rod weeders ordinarily are used in combination with plowing apparatus that is drawn by the tractor.

The plowing apparatus ordinarily includes a wide framework with a large number of spaced chisel plows mounted thereon. This enables a farmer to plow and weed a wide area with each pass over a field. By reducing the number of passes over a field, a farmer saves considerable time and fuel.

While it is desirable to cover a large area with each pass, the use of very wide equipment of thirty or forty feet or more in width can present serious problems. Transfer of the equipment from one field to another can be difficult. Gates between fields generally are less than twenty feet in width.

In order to get the equipment through the gates, the equipment generally is constructed with one or more pivoting outrigger sections. These outrigger sections may swing upwardly or horizontally to decrease the overall width of the apparatus and thus allow the equipment to pass through the gate. The same problem is encountered when it is necessary to move the equipment along a road or lane.

Rod weeders generally employ some type of drive mechanism to rotate the rods. One alternative is to employ separate drive mechanisms for the outrigger rod sections as well as for the main section. Another arrangement is to couple the outrigger sections to the main section during use. This coupling ordinarily is accomplished through the use of universal joints.

While both of these expedients provide satisfactory results, they are not considered to be ideal solutions. Multiple drive mechanisms involve considerable additional expenditure. On the other hand, the use of universal joints requires that the operator leave his working position each time it is necessary to couple or uncouple the drive mechanism.

Over a period of a day, this can add up to a substantial amount of lost time, thus reducing the productivity of the operator and his machinery. In addition, the frequent interruptions can be frustrating for the operator and cause him to become irritable and less careful in his work.

From the above discussion, it is clear that previous drive assemblies are not satisfactory in a significant number of situations. Thus, there is a need for a new drive assembly that overcomes the deficiencies of present mechanisms.

The present invention provides a novel drive assembly that can be used conveniently under a variety of drive conditions. The drive assembly of the present invention facilitates coupling and uncoupling. The coupling can be accomplished automatically, without hand labor. The drive assembly of the invention can be adapted to different drive line combinations easily.

The drive assembly of the invention is simple in design and can be produced relatively inexpensively. The assembly can be fabricated from commercially available materials and components employing conventional metal working manufacturing techniques and procedures.

The drive assembly can be installed quickly and easily without special tools. The installation can be accomplished by persons with limited mechanical skills or experiences.

The drive assembly is durable in construction and has a long useful life. Little, if any, maintenance is required to keep the drive assembly in operating condition.

These and other advantages and benefits of the novel drive assembly of the present invention will be apparent from the following description and accompanying drawings in which:

FIG. 1 is a view in perspective of one form of the drive assembly of the invention employed with rod weeder mechanism mounted on plowing apparatus;

FIG. 2 is an enlarged fragmentary back view of the drive assembly shown in FIG. 1 moving into a locked position;

FIG. 3 is a greatly enlarged side view of the drive assembly shown in FIG. 2;

FIG. 4 is a sectional view of the drive assembly separated from an adjoining rod section.

As shown in FIGS. 1 and 2 of the drawings, one form of the novel drive assembly 11 of the present invention is employed with rod weeder mechanism 12 on plowing apparatus 13 that is drawn by a tractor 14. The plowing apparatus 13 includes outrigger sections 16 and 17. Outrigger section 16 is shown raised off the ground, a position in which both outrigger sections 16 and 17 normally would be placed for transport through a gate or along a roadway.

The rod weeder mechanism 12 is attached to the plowing apparatus 13 through suitable brackets 18. One end of each bracket 18 is secured to the plow hangers 19 adjacent the chisels or spades 20. The opposite ends of the brackets 18 include bearings 21 through which rod or shaft sections 22, 23 and 24 extend.

One form of the novel drive assembly 11 of the present invention includes first and second shaft ends 25 and 26. The shaft ends 25 and 26 normally are disposed closely adjacent to one another with their respective shaft sections 22 and 23 aligned axially in an end to end relationship.

The drive assembly 11 includes a coupling portion 27 that operatively connects adjacent shaft ends 25 and 26. The coupling portion 27 includes a resilient section 28 that extends between the adjacent shaft ends. Advantageously, the resilient section 28 is a coil spring section 29 as shown in the drawings.

The coupling portion 27 also includes a connector section 30 extending from one end 31 of the resilient section 28. The connector section 30 includes an axial opening 32. Adjacent end 25 of the first shaft section 22 is affixed within the connector section opening 32.

A guide section 33 also is included in the coupling portion 27. The guide section 33 extends from the opposite end 34 of the resilient section 28. The guide section 33 includes an enlarged end section 36. Advantageously, the end section 36 has a generally conical configuration. The guide section 33 also includes an axial bore 37 extending therethrough. The bore 37 slidably engages the adjacent end 26 of the second shaft section 23. The axial bore 37 through the guide section 33 has a cross section substantially the same as the cross-sectional configuration of the second shaft end 26, but slightly larger.

FIGS. 1, 2 illustrate the use of a length compensating assembly 40 with the drive assembly 11 of the invention. The compensating assembly 40 is employed to provide variations in the length of the rod sections 22–24 during the connection of the drive assembly. These variations in length may be necessary in situations where the angle between the respective rod sections is quite large in the open position, or when operating on uneven ground.

To achieve a positive interconnection of the adjacent rod sections, means are provided to fix the respective rods against rotation with respect to the adjacent rod and the coupling portion 27. As shown in FIGS. 1–4 this is accomplished by employing rod sections with cross sections having a plurality of sides. While rod sections are illustrated which are square in cross section, other multi-sided configurations such as triangles, hexagons and the like may be utilized if desired.

In the installation of the drive assembly 11 of the present invention as shown in the drawings, the rod sections 22, 23 and 24 of the rod weeder mechanism 12 are mounted on the back of the plowing apparatus 13 in the conventional manner. First, the rod support brackets 18 are attached to the plow hangers 19 with the bearings 21 extending rearwardly therefrom. Next, the rod sections are inserted through the bearings 21 in an end to end relationship with their ends 25 and 26 adjacent to one another.

The coupling portion 27 then is secured to one end of the rod sections by inserting the connector section 30 onto the rod end 25 and securing thereto. This may be accomplished through suitable fastening means such as welding, a bolt or the like. Thereafter, the adjacent end 26 of the adjoining rod section 23 is slid into the bore 37 in the guide section 33 of the coupling portion 27. The rod end 26 is inserted a sufficient distance to provide a secure connection to the guide section. In the same way, the coupling portions 27 are installed at each point where separation of the rod sections is desired.

A drive mechanism for the rod weeder such as one or more ground drive wheels 80 are operatively connected to the rod assembly through appropriate linkages (not shown). The plowing apparatus 13 then is hitched to a tractor 14 and the machinery is ready for use in the same way that conventional rod weeding/plowing combinations normally are used. As the machinery is drawn over a field, the plow spades 20 move through the upper layer of the soil loosening it. The rotating rods 22, 23 and 24 follow through loosened soil, separating the weeds therefrom.

When the field has been cultivated completely and it is desired to move the machinery to another field, the operator raises the outrigger sections 16 and 17 by activating controls at the driver's position. These controls may activate hydraulic cylinders (not shown) that raise each of the outriggers 16 and 17 into a substantially vertical position. This action reduces the overall width of the machinery to about that of the central section 15. The machinery now can pass through a gate easily and into the next field to be cultivated.

During the raising of the outrigger sections 16 and 17, the rod sections separate at the drive assemblies 11. End 26 of rod 23 withdraws from the bore 37 of the guide section 33 of the drive assembly. Since the coupling portion 27 is affixed to the rod end 25 of the rod 22 through the connector section 30, the coupling portion 27 remains attached to the rod 22 during the pivoting of the outrigger sections 16 and 17.

After the machinery has passed into the next field, the machinery is returned to an operating position by lowering the outrigger sections to a horizontal alignment again. As the outrigger sections approach a horizontal position, the rod sections 22, 23 and 24 are reconnected automatically. The ends 26 of the rod sections slide into the bores 37 of the guide sections 33. The reconnection is accomplished easily and without binding between the rod ends 26 and the bores 37.

Once the rod ends 26 are securely positioned within bores 37, the rod sections 22, 23 and 24 are operatively interconnected again and the machinery can be drawn over a new field with the ground wheels driving the rod sections. The same sequence is repeated each time it is necessary to reduce the width of the machinery. The outrigger sections 16 and 17 are raised or lowered as required and the separation and reconnection of the drive assemblies is accomplished without the operator leaving his normal operating station.

When it is necessary to provide for significant changes in the length of the rod sections during coupling, one or more length compensating assemblies 40 may be disposed along the lengths of the rod sections 22, 23 and/or 24. Advantageously, the compensating assemblies 40 are located adjacent to a rod support bracket 18.

While the above description and the drawings illustrate the use of the drive assembly 11 on a rod weeder mechanism, the drive assembly also may be employed with other wing up drive assemblies such as augers, etc. Other drive assemblies, for example, in-line drive combinations such as tractor PTO couplings, and the like may also be utilized.

The above description and the accompanying drawings show that the present invention provides a novel drive assembly that can be employed successfully in a variety of different drive conditions. The drive assembly of the invention is simple in design and relatively inexpensive. The drive assembly facilitates automatic coupling and uncoupling so the coupling can be controlled from remote locations conveniently.

The drive assembly of the present invention can be fabricated from commercially available materials and components employing conventional metal working techniques. The drive assembly is durable in construction and has a long useful life without maintenance. The assembly can be installed quickly and easily by workmen with a minimum of skill and experience.

It will be apparent that various modifications can be made in the particular drive assembly described in detail above and shown in the drawings within the scope of the invention. The size, configuration and arrangement of components can be different to meet specific requirements. Also, other resilient section and guide section designs can be employed provided the functioning and operation of the drive assembly is not adversely affected. Therefore, the scope of the invention is to be limited only by the following claims.

What is claimed is:

1. A separable drive assembly including first and second shafts, said shafts being normally aligned axially in an end to end relationship and being pivotably separable from one another, a coupling portion selectively operatively connecting adjacent ends of said first and second shafts, said coupling portion including a resilient section including a coil spring, a connector section extending from one end of said resilient section, said connector section including a first axial bore therethrough, said adjacent end of said first shaft engaging and being affixed within one end of said first axial bore, a guide section extending from an opposite end of said resilient section, said guide section including an enlarged generally conical end section remote from said resilient section, a second axial bore extending through said guide section, an adjacent end of said second shaft being capable of slidable engagement with said conical end section and said second axial bore within said guide section, said axial bore adjacent said conical end section having a cross section with a plurality of sides substantially the same as the cross-sectional configuration of said second shaft but slightly larger to fix said second shaft against rotation with respect to said coupling portion; whereby moving said adjacent first and second shaft ends toward each other will cause the end of said second shaft to slidably engage said second axial bore within said guide section of said coupling portion to operatively connect said first and second shafts in a drive assembly.

2. A separable drive assembly according to claim 1 wherein said drive assembly is part of a rod weeding apparatus.

3. A separable drive assembly according to claim 2 wherein said rod weeding apparatus includes rod drive means.

* * * * *